United States Patent
Duan et al.

(10) Patent No.: US 11,834,589 B2
(45) Date of Patent: Dec. 5, 2023

(54) METHOD FOR PREPARING A MODIFIED ENVIRONMENT-FRIENDLY CORN STARCH ADHESIVE

(71) Applicant: Hongsheng Technology (Beijing) Co., Ltd, Beijing (CN)

(72) Inventors: Zhongda Duan, Beijing (CN); Runda Yan, Beijing (CN)

(73) Assignee: HONGSHENG TECHNOLOGY (BEIJING) CO., LTD, Beijing (CN)

(*) Notice: Subject to any disclaimer, the term of this patent is extended or adjusted under 35 U.S.C. 154(b) by 79 days.

(21) Appl. No.: 17/072,580

(22) Filed: Oct. 16, 2020

(65) Prior Publication Data
US 2021/0253917 A1 Aug. 19, 2021

(30) Foreign Application Priority Data
Aug. 22, 2019 (CN) .......................... 201910780115.X

(51) Int. Cl.
| | | |
|---|---|---|
| C09J 129/04 | (2006.01) | |
| C08J 3/24 | (2006.01) | |
| C08K 3/38 | (2006.01) | |
| C08K 5/092 | (2006.01) | |
| C09J 103/02 | (2006.01) | |
| C08K 3/16 | (2006.01) | |

(52) U.S. Cl.
CPC ............... *C09J 129/04* (2013.01); *C08J 3/24* (2013.01); *C08K 3/38* (2013.01); *C08K 5/092* (2013.01); *C09J 103/02* (2013.01); *C08J 2303/02* (2013.01); *C08J 2329/04* (2013.01); *C08K 2003/162* (2013.01)

(58) Field of Classification Search
CPC ..................................... C08L 3/02; C08L 3/38
See application file for complete search history.

(56) References Cited

U.S. PATENT DOCUMENTS

| | | | | |
|---|---|---|---|---|
| 4,094,718 A | * | 6/1978 | Czerwin | D21H 27/40 524/53 |
| 6,280,515 B1 | * | 8/2001 | Lydzinski | C09J 103/06 521/65 |
| 2012/0289628 A1 | * | 11/2012 | Ceulemans | C08L 33/02 524/48 |
| 2013/0284637 A1 | * | 10/2013 | Chou | C11D 3/2093 206/568 |
| 2020/0248042 A1 | * | 8/2020 | Holtan | C09D 129/04 |

FOREIGN PATENT DOCUMENTS

| | | | | |
|---|---|---|---|---|
| CN | 105885728 A | | 8/2016 | |
| CN | 106753040 A | | 5/2017 | |
| CN | 107868627 A | * | 4/2018 | ........... C08B 31/185 |
| WO | 2006102809 A1 | | 10/2006 | |

* cited by examiner

*Primary Examiner* — Liam J Heincer

(57) ABSTRACT

The present disclosure relates to a modified environment-friendly corn starch adhesive, comprising the following components in parts by weight: 30 parts of corn starch, 300-400 parts of water, 0.2-3 parts of oxidant, and 80-120 parts of polyvinyl alcohol, 1-5 parts of cross-linking agent, 3-5 parts of calcium chloride, 0.1-3 parts of urea, 0.2-0.5 parts of defoamer, and an appropriate amount of sodium hydroxide (to adjust pH), the cross-linking agent is a modified boric acid cross-linking agent prepared by reacting boric acid with epichlorohydrin, water and citric acid at 80-100° C. The surface of the modified boric acid cross-linking agent is bonded with a large number of epoxy groups and carboxyl groups, which can react with the carboxyl and aldehyde groups of the oxidized starch. These reactions can form synergistic effect with boric acid, which together improve the bonding efficiency and improve the adhesive strength of the colloid.

6 Claims, No Drawings

METHOD FOR PREPARING A MODIFIED ENVIRONMENT-FRIENDLY CORN STARCH ADHESIVE

CROSS REFERENCE TO RELATED APPLICATION

This application claims priority of Chinese Application No. 201910780115.X filed on Aug. 22, 2019 and entitled "method for preparing a modified environment-friendly corn starch adhesive".

TECHNICAL FIELD

The present disclosure belongs to the technical field of adhesives, and specifically relates to a corn starch adhesive for cartons.

BACKGROUND

China produces a huge amount of corrugated paper every year, and the annual output has reached nearly 100 billion cubic meters. If calculated based on the consumption of 90-120 g of adhesive per 1 $M^3$ produced, nearly 10 million tons of adhesive is consumed each year. China has strictly restricted the use of sodium silicate in the production of corrugated paper. At present, most carton factories use adhesives made from corn starch. Corn starch adhesive is a kind of adhesive with good performance, non-toxicity and low price. Since its appearance in the United States in 1935, especially in the contemporary era when the environmental crisis is getting worse, it has attracted more and more attention. However, most carton factories are single-machine production, lacking drying equipment, relying entirely on natural drying, drying time is long, and the glue is easy to penetrate. The use of traditional corn starch adhesive is not suitable for production needs. Therefore, the processing of corn starch adhesive is an important way to improve its adhesive property. The processing technology of starch adhesive includes pre-gelatinization, oxidation, alkali gelatinization, adding stabilizer and the like. Wherein oxidation is the most critical process.

Corn starch is a natural high molecular compound composed of α-D-hexacyclic glucose. From the molecular structure, it can be classified into amylose and amylopectin. Wherein the amylose accounts for about 23% of the corn starch and is soluble in hot water, which connects with α-D-hexacyclic glucose through α-1,4-glycoside bonds and the average degree of polymerization is about 70-350. The amylopectin accounts for about 77% of the corn starch and is insoluble in water, wherein the macromolecular backbones are formed by connecting with α-1,4-glycoside bonds, the branched chains are composed of some short amyloses, and the average degree of polymerization is about 280-5700. Under the action of an oxidant, the primary alcohol groups (—$CH_2OH$) on the sixth carbon atom of the starch molecule are first oxidized to aldehyde groups (—CHO), and some are further oxidized to carboxyl groups (—COOH), which can react with the modifier to form polymer film to prevent the adhesive from penetrating into the corrugated paper and improve the initial adhesion performance. However, the adhesive prepared by the prior art still has problems such as weak adhesive property and poor water resistance.

SUMMARY

In order to solve the shortcomings of the prior art, the present disclosure provides a modified environment-friendly corn starch adhesive, comprising the following components in parts by weight: 30 parts of corn starch, 300-400 parts of water, 0.2-3 parts of oxidant, and 80-120 parts of polyvinyl alcohol, 1-5 parts of cross-linking agent, 3-5 parts of calcium chloride, 0.1-3 parts of urea, 0.2-0.5 parts of defoamer, and an appropriate amount of sodium hydroxide (to adjust pH);

The corn starch has less than 0.6% protein content, 12%-14% water, and less than 0.4% sulfur dioxide. The purpose of controlling the protein content of starch is to avoid the peculiar smell caused by the reaction of excessive protein and oxidant during long-term storage of adhesive. At the same time, excessive sulfur dioxide can easily aggregate starch and cause flocculation.

The oxidant is potassium permanganate, which is an oxidant that decomposes and breaks the chain of macromolecule, and can change the viscosity and fluidity of the adhesive through oxidation.

The cross-linking agent is a modified boric acid cross-linking agent prepared by reacting boric acid with epichlorohydrin, water and citric acid at 80-100° C. The mass ratio of water, boric acid, epichlorohydrin and citric acid is 100:20-30:2-5:0.2-3.

The surface of the modified boric acid cross-linking agent is bonded with a large number of epoxy groups and carboxyl groups, which can react with the carboxyl and aldehyde groups of the oxidized starch. These reactions can form synergistic effect with boric acid, which together improve the bonding efficiency and improve the adhesive strength of the colloid; due to the joint action of multiple groups, the moisture resistance of the adhesive film is greatly improved.

The defoamer is at least one kind selected from the group of water-soluble silicone Q-119 and Y-610. The water-soluble defoamer can dissolve in the reaction system better and improve the antifoaming efficiency.

The calcium chloride mainly acts as a dispersant. Adding a small amount of calcium chloride can make the system disperse more uniformly and further reduce the amount of bubbles cooperating with the defoamer.

The urea acts as a cross-linking assistant. The amide groups of the urea can bond with the hydroxyl and carboxyl groups of the starch, thereby preventing rapid complexation between starch, and playing anti-condensation effect.

The present disclosure also provides a method for preparing the starch adhesive, which specifically comprises the following steps:

(1) modification of the boric acid cross-linking agent: after mixing water, boric acid, epichlorohydrin and citric acid according to the mass ratio, adding sodium hydroxide to adjust pH to 8-10, and heating a mixture to 80-100° C. to react for 1-2 h; after the reaction is completed, adding a certain amount of absolute ethanol, continuously stirring for 10-20 min, filtering and drying to obtain a modified boric acid cross-linking agent.

The function of the absolute ethanol is to realize the rapid separation of solid phase and liquid phase.

(2) adding a certain amount of water to a three-necked flask, heating water to 50° C., adding corn starch and solid potassium permanganate successively under stirring, and adjusting pH to 2-3 with hydrochloric acid; incubating for 2-3 h, then heating a mixture to 75° C., and adding the modified boric acid cross-linking agent to incubate for 1 h; then adding polyvinyl alcohol and calcium chloride, and ultrasonically dispersing them; continuously heating the mixture to 90° C. to incubate for 1 h; adding a certain amount of sodium hydroxide to adjust pH to neutral, adding urea, calcium chloride and defoamer to continuously incubating for 1 h, and cooling and discharging to obtain an environment-friendly corn starch adhesive.

Due to the agglomeration effect of polyvinyl alcohol, it is difficult to achieve uniform diffusion of polyvinyl alcohol by traditional stirring dispersion. The present disclosure uses calcium chloride as a dispersant, and utilizes the penetration effect of chloride ions and calcium ions combined with ultrasonic physical effects to make it diffuse rapidly.

The beneficial effect of the present disclosure is that by using the modified boric acid cross-linking agent, the cross-linking effect between cross-linking agent and starch oxide can be greatly improved, the adhesive property is stronger, the curing time is short and the water resistance is better. The preparation method of the disclosure is simple and has strong operability.

DETAILED DESCRIPTION

The present disclosure will be further described below in conjunction with embodiments, and the described embodiments are only a part of the embodiments of the present disclosure. Based on the embodiments of the present disclosure, equivalent replacements or improvements made by those of ordinary skill in the art without creative work are within the protection scope of the present disclosure. In order to ensure the transparency and service life of the starch adhesive prepared by the present disclosure, the corn starch used in the present disclosure has less than 0.6% protein content, 12%-14% water, and less than 0.4% sulfur dioxide.

Embodiment 1

A modified environment-friendly corn starch adhesive, comprising the following components in parts by weight: 30 parts of corn starch, 360 parts of water, 0.4 parts of potassium permanganate, 100 parts of polyvinyl alcohol, 3 parts of modified boric acid cross-linking agent, 4 parts of calcium chloride, 0.8 parts of urea, 0.3 parts of Q-119 type silicone defoamer, and an appropriate amount of sodium hydroxide (to adjust pH);

The method for preparing the modified environment-friendly corn starch adhesive, comprising the following steps:

(1) modification of the boric acid cross-linking agent: after mixing 100 g of water, 25 g of boric acid, 3 g of epichlorohydrin and 1 g of citric acid according to the mass ratio, adding sodium hydroxide to adjust pH to 8-10, and heating a mixture to 90° C. to react for 60 min; after the reaction is completed, adding 20 ml of absolute ethanol, continuously stirring for 15 min, filtering and drying to obtain a modified boric acid cross-linking agent.

(2) adding 350 g of water to a three-necked flask, heating the water to 50° C., adding 30 g of corn starch under stirring; after the corn starch is fully dispersed, adding 0.4 g of solid potassium permanganate, and adjusting pH to 2-3 with hydrochloric acid; incubating for 2.5 h, then heating the mixture to 75° C., and adding 3 g of the modified boric acid cross-linking agent and continuously stirring for 20 min to ensure that the modified boric acid cross-linking agent is completely dispersed in the system; then 100 g of polyvinyl alcohol and 4 g of calcium chloride are added, and incubating and ultrasonically dispersing for 30 min; after the dispersion is completed, continuously heating the mixture to 90° C. to incubate for 1 h; adding a certain amount of sodium hydroxide to adjust pH to neutral, adding 0.8 g of urea, and 0.3 g of the defoamer to continuously incubating for 1 h, and cooling and discharging to obtain an environment-friendly corn starch adhesive.

Embodiment 2

A modified environment-friendly corn starch adhesive, comprising the following components in parts by weight: 30 parts of corn starch, 360 parts of water, 1 part of potassium permanganate, 100 parts of polyvinyl alcohol, 3 parts of modified boric acid cross-linking agent, 4 parts of calcium chloride, 0.8 parts of urea, 0.3 parts of Y-610 type silicone defoamer, and an appropriate amount of sodium hydroxide (to adjust pH);

The method for preparing the modified environment-friendly corn starch adhesive, comprising the following steps:

(1) modification of the boric acid cross-linking agent: after mixing 100 g of water, 21 g of boric acid, 3 g of epichlorohydrin and 0.8 g of citric acid according to the mass ratio, adding sodium hydroxide to adjust pH to 8-10, and heating a mixture to 90° C. to react for 60 min; after the reaction is completed, adding 15 ml of absolute ethanol, continuously stirring for 25 min, filtering and drying to obtain a modified boric acid cross-linking agent.

(2) adding 350 g of water to a three-necked flask, heating water to 50° C., adding 30 g of corn starch under stirring; after the corn starch is fully dispersed, adding 1 g of solid potassium permanganate, and adjusting pH to 2-3 with hydrochloric acid; incubating for 2.5 h, then heating a mixture to 75° C., and adding 3 g of the modified boric acid cross-linking agent and continuously stirring for 20 min to ensure that the modified boric acid cross-linking agent is completely dispersed in the system; then adding 100 g of polyvinyl alcohol and 4 g of calcium chloride, and incubating and ultrasonically dispersing for 30 min; after the dispersion is completed, continuously heating the mixture to 90° C. to incubate for 1 h; adding a certain amount of sodium hydroxide to adjust pH to neutral, adding 0.8 g of urea, and 0.3 g of Y-610 type defoamer to continuously incubating for 1 h, and cooling and discharging to obtain an environment-friendly corn starch adhesive.

Embodiment 3

A modified environment-friendly corn starch adhesive, comprising the following components in parts by weight: 30 parts of corn starch, 380 parts of water, 0.6 part of potassium permanganate, 110 parts of polyvinyl alcohol, 4 parts of modified boric acid cross-linking agent, 4 parts of calcium chloride, 2 parts of urea, 0.3 parts of Y-610 type silicone defoamer, and an appropriate amount of sodium hydroxide (to adjust pH);

The method for preparing the modified environment-friendly corn starch adhesive, comprising the following steps:

(1) modification of the boric acid cross-linking agent: after mixing 100 g of water, 28 g of boric acid, 3 g of epichlorohydrin and 1 g of citric acid according to the mass ratio, adding sodium hydroxide to adjust pH to 8-10, and heating a mixture to 90° C. to react for 60 min; after the reaction is completed, adding 15 ml of absolute ethanol, continuously stirring for 25 min, filtering and drying to obtain a modified boric acid cross-linking agent.

(2) adding 380 g of water to a three-necked flask, heating water to 50° C., adding 30 g of corn starch under stirring; after the corn starch is fully dispersed, adding 0.6 g of solid potassium permanganate, and adjusting pH to 2-3 with hydrochloric acid; incubating for 2.5 h, then heating a mixture to 75° C., and adding 4 g of the modified boric acid cross-linking agent and continuously stirring for 20 min to ensure that the modified boric acid cross-linking agent is completely dispersed in the system; then adding 110 g of polyvinyl alcohol and 4 g of calcium chloride, and incubating and ultrasonically dispersing for 30 min; after the dispersion is completed, continuously heating the mixture to 90° C. to incubate for 1 h; adding a certain amount of sodium hydroxide to adjust pH to neutral, adding 2 g of urea, and 0.3 g of Y-610 type defoamer to continuously incubating for 1 h, and cooling and discharging to obtain an environment-friendly corn starch adhesive.

The adhesive strength of the adhesive prepared in the above embodiment s is tested by the test method which is GB/T6548-1998 adhesive strength determination method of corrugated cardboards, and the test results are:

Embodiment 1: 71.2N/10 cm;
Embodiment 2: 69.4N/10 cm;
Embodiment 3: 70.1N/10 cm.

The results of the above embodiments show that the adhesive strength of the prepared adhesives are all greater than 58.8N/10 cm, which meets the GB5034-85 corrugated cardboard standard requirements for packaging products out of the warehouse.

The above is only preferred exemplary embodiments of the present disclosure and is not intended to be limiting of the present disclosure, and any modifications, equivalent substitutions, improvements and the like within the spirit and principle of the present disclosure are intended to be embraced by the protection range of the present disclosure.

What is claimed is:

1. A modified environment-friendly corn starch adhesive, comprising the following components in parts by weight: 30 parts of corn starch, 300-400 parts of water, 0.2-3 parts of oxidant, and 80-120 parts of polyvinyl alcohol, 1-5 parts of cross-linking agent, 3-5 parts of calcium chloride, 0.1-3 parts of urea, 0.2-0.5 parts of defoamer, and an appropriate amount of sodium hydroxide (to adjust pH); wherein the cross-linking agent is a modified boric acid cross-linking agent prepared by reacting boric acid with epichlorohydrin, water and citric acid at 80-100° C.

2. The modified environment-friendly corn starch adhesive according to claim 1, wherein a mass ratio of water, boric acid, epichlorohydrin and citric acid used for modification of the boric acid cross-linking agent is 100:20-30:2-5:0.2-3.

3. The modified environment-friendly corn starch adhesive according to claim 1, wherein the corn starch has less than 0.6% protein content, 12%-14% water, and less than 0.4% sulfur dioxide.

4. The modified environment-friendly corn starch adhesive according to claim 1, wherein the oxidant is potassium permanganate.

5. The modified environment-friendly corn starch adhesive according to claim 1, wherein the defoamer is at least one kind selected from the group of water-soluble silicone Q-119 and Y-610.

6. A method for preparing the modified environment-friendly corn starch adhesive according to any one of claim 1, comprising the following steps:
   (1) modification of the boric acid cross-linking agent: after mixing water, boric acid, epichlorohydrin and citric acid according to a mass ratio, adding sodium hydroxide to adjust pH to 8-10, and heating a mixture to 80-100° C. to react for 1-2 h; after the reaction is completed, adding a certain amount of absolute ethanol, continuously stirring for 10-20 min, filtering and drying to obtain a modified boric acid cross-linking agent;
   (2) adding a amount of water to a three-necked flask, heating the water to 50° C., adding corn starch and solid potassium permanganate successively under stirring, and adjusting pH to 2-3 with hydrochloric acid; incubating a mixture for 2-3 h, then heating the mixture to 75° C., and adding the modified boric acid cross-linking agent to incubate for 1 h; then adding polyvinyl alcohol and calcium chloride, and ultrasonically dispersing them; continuously heating the mixture to 90° C. to incubate for 1 h; adding a amount of sodium hydroxide to adjust pH to neutral, adding urea, calcium chloride and defoamer to continuously incubating for 1 h, and cooling and discharging to obtain an environment-friendly corn starch adhesive.

* * * * *